(12) United States Patent
Hussain

(10) Patent No.: US 10,794,215 B2
(45) Date of Patent: Oct. 6, 2020

(54) COOLING ARRANGEMENT FOR A TURBINE CASING OF A GAS TURBINE ENGINE

(71) Applicant: ROLLS-ROYCE plc, London (GB)

(72) Inventor: Zahid Hussain, Derby (GB)

(73) Assignee: ROLLYS-ROYCE PLC, London (GB)

( * ) Notice: Subject to any disclaimer, the term of this patent is extended or adjusted under 35 U.S.C. 154(b) by 180 days.

(21) Appl. No.: 16/149,179

(22) Filed: Oct. 2, 2018

(65) Prior Publication Data
US 2019/0136713 A1    May 9, 2019

(30) Foreign Application Priority Data
Nov. 3, 2017 (GB) .................................... 1718234.6

(51) Int. Cl.
*F01D 11/24* (2006.01)
*F01D 25/12* (2006.01)

(52) U.S. Cl.
CPC .............. *F01D 11/24* (2013.01); *F01D 25/12* (2013.01); *F05D 2220/32* (2013.01); *F05D 2240/10* (2013.01); *F05D 2260/201* (2013.01)

(58) Field of Classification Search
CPC .. F01D 9/06; F01D 25/12; F01D 11/24; F16L 9/18
USPC .................................................. 138/148, 114
See application file for complete search history.

(56) References Cited

U.S. PATENT DOCUMENTS

| | | | | |
|---|---|---|---|---|
| 1,023,530 A | * | 4/1912 | Schofer ..................... | F16L 9/18 138/114 |
| 2,475,635 A | * | 7/1949 | Parsons ..................... | F16L 9/18 285/123.15 |
| 8,668,431 B2 | * | 3/2014 | Rog ......................... | F01D 11/24 415/1 |
| 2010/0150700 A1 | | 6/2010 | Strecker et al. | |
| 2010/0215481 A1 | | 8/2010 | Negulescu et al. | |
| 2016/0251981 A1 | | 9/2016 | Hashimoto | |

FOREIGN PATENT DOCUMENTS

| | | | |
|---|---|---|---|
| DE | 2718623 A1 | * 2/1978 | ............. F01D 11/24 |
| EP | 2 236 772 A2 | 10/2010 | |
| EP | 2 497 907 A2 | 9/2012 | |
| GB | 2 183 296 A | 6/1987 | |
| WO | 2014105522 | 7/2014 | |
| WO | WO 2014/105515 A1 | 7/2014 | |
| WO | 2015169555 | 11/2015 | |

OTHER PUBLICATIONS

Great Britain Search Report dated Mar. 28, 2018, issued in GB Patent Application No. 1718234.6.
Corrected Great Britain Search Report, issued in Great Britain Application 1718234.6, dated Mar. 28, 2018, p. 1, Intellectual Property Office of the United Kingdom, Newport, South Wales, UK.
Partial European Search Report, issued in European Application 18198411.3, dated Apr. 9, 2019, pp. 1-17, European Patent Office, Munich, Germany.

* cited by examiner

*Primary Examiner* — Richard A Edgar

(74) *Attorney, Agent, or Firm* — Brinks Gilson & Lione

(57) ABSTRACT

There is disclosed a cooling arrangement for a turbine casing (50) of a gas turbine engine (10). The cooling arrangement comprises a first cooling duct (203) that is at least partly within a second cooling duct (204). The first cooling duct is for a first cooling fluid flow and the second cooling duct is for a second cooling fluid flow which flows around the first cooling duct.

16 Claims, 6 Drawing Sheets

COOLING ARRANGEMENT FOR A TURBINE CASING OF A GAS TURBINE ENGINE

CROSS-REFERENCE TO RELATED APPLICATIONS

This application is based upon and claims the benefit of priority from British Patent Application No. GB 1718234.6, filed on 3 Nov. 2017, the entire contents of which are herein incorporated by reference.

BACKGROUND

Technical Field

The present disclosure relates to a cooling arrangement for a turbine casing of a gas turbine engine.

Description of Related Art

A gas turbine engine 10 is shown in FIG. 1 and comprises a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

A turbine case generally surrounds the high pressure turbine 17, intermediate pressure turbine 18 and low pressure turbine 19. The turbine case may be a single case extending axially around all three turbines 17, 18, 19 or individual turbine cases may be provided for each turbine 17, 18, and 19.

It is typically necessary to selectively cool at least some of the turbine case during some engine running conditions in order to, e.g., reduce the clearance between the tips of the rotor blades of the turbine stage and the turbine case to improve engine performance.

For this purpose it is known to provide a plurality of annular manifolds around the turbine case, each manifolds in use directing cooling air towards the turbine case. In a previously considered arrangement each manifold is provided with a circular duct which supplies the manifold with cooling air from the bypass duct. The circular ducts are typically arranged side-by-side.

Whilst this arrangement may be satisfactory, it may be desirable to provide an improved cooling arrangement.

SUMMARY

According to an aspect there is provided a cooling arrangement for a turbine casing of a gas turbine engine, comprising a first cooling duct that is located within a second cooling duct, wherein the first cooling duct is for a first cooling fluid flow and wherein the second cooling duct is for a second cooling fluid flow which in use flows around the first cooling duct. The first cooling duct may be an inner duct and the second cooling duct may be an outer duct. The second duct may surround the inner duct. An inner flow passageway may be formed within the first duct. An outer flow passageway may be formed between the first and second ducts. The outer flow passageway may be annular. The outer flow passageway may completely surround the first duct. The first duct may be centrally located within the second duct.

The first cooling duct and the second cooling duct may feed into a single manifold having outlet holes for directing cooling fluid towards the turbine casing. The first cooling duct and the second cooling duct may feed into separate manifolds, each manifold having outlet holes for directing cooling fluid towards the turbine casing.

The first cooling duct may be enclosed by the second cooling duct along the majority or substantially all of its length. The first cooling duct may comprise a length portion that is not within or enclosed by the second cooling duct.

The second cooling duct may be configured to allow the cooling fluid to flow therethrough substantially unmodulated.

Electronic equipment and/or one or more cables may be mounted to the first cooling duct. The electronic equipment and/or the one or more cables may be mounted to an inner side and/or an outer side of the first cooling duct.

The first cooling duct may comprise a valve, such as a butterfly valve, for controlling the flow of the first cooling fluid.

The first cooling duct and/or the second cooling duct may have a substantially square or rectangular cross-section in a plane perpendicular to the longitudinal direction. The first cooling duct and/or the second cooling duct may comprise one or more substantially planar walls.

The second cooling duct may be provided with a shielded tray on an outer surface thereof, the shielded tray being defined by a wall of the second cooling duct and one or more lips projecting from the cooling duct. Electronic equipment and/or one or more cables may be within the shielded tray.

The first cooling duct may be mounted within the second cooling duct by at least one support element extending from one or more corners of the second cooling duct.

There is also provided a gas turbine engine comprising a cooling arrangement in accordance with any statement herein.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

DESCRIPTION OF THE DRAWINGS

Embodiments will now be described by way of example, with reference to the Figures, in which.

DETAILED DESCRIPTION

In all the Figures the general airflow direction is from left to right. Thus components drawn towards the left of any of the figures may be referred to as 'upstream' and those further towards the right of any of the figures may be referred to as 'downstream'.

Figure 1:
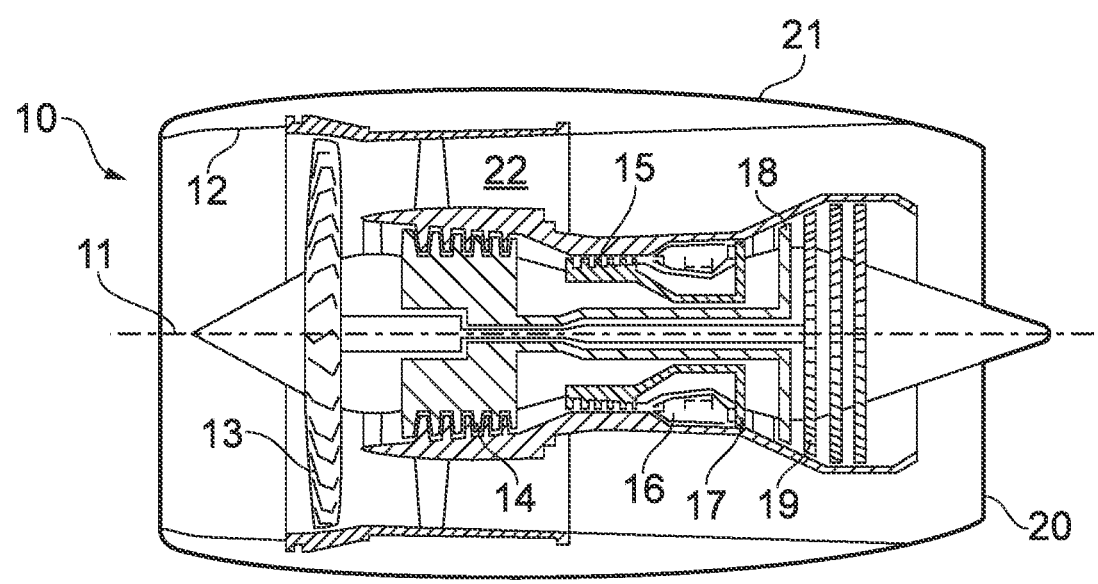
FIG. 1 schematically shows a sectional side view of a gas turbine engine.
Figure 2:
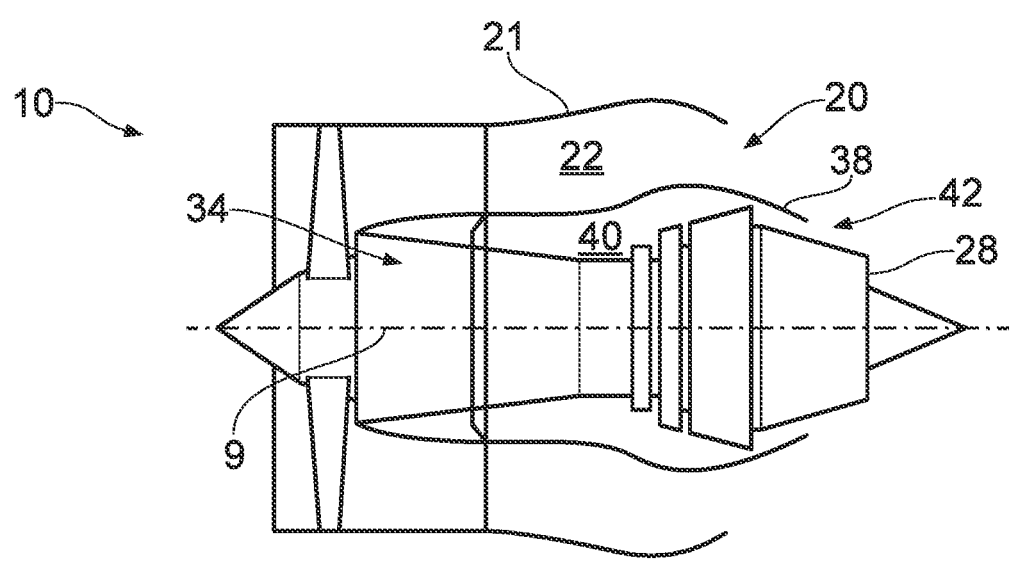
FIG. 2 schematically shows is a schematic side view of a gas turbine engine.

Referring to FIG. 2 the gas turbine engine 10 comprises a core engine 34 that includes the compressors, combustor, and turbines. The core engine 34 has the exhaust nozzle 28, sometimes referred to as the hot nozzle, at its axially downstream end at the exit of the high pressure turbine. Radially outside and spaced from the core engine 34 is the nacelle 21 which partially defines the bypass duct 22. At the axially downstream end of the bypass duct 22 is a bypass exhaust nozzle 20, sometimes referred to as the cold nozzle. The radially inner extent of the bypass duct 22 is defined by an annular structure 38. The annular structure 38 may extend axially rearwards beyond the bypass exhaust nozzle 20.

The annular space that is radially between the core engine 34 and the annular structure 38 defines a flow zone 40. The flow zone 40 comprises a flow zone nozzle 42 at its axially downstream end. The flow zone nozzle 42 is defined by the most axially rearward portion of the annular structure 38 and the radially outer surface of the exhaust nozzle 28.

The flow zone 40 is configured for ingress of ventilation air bled from the bypass duct 32 which flows through the flow zone 40 and is expelled through the flow zone nozzle 42 in order to maintain a purge flow through the flow zone 40.

Figure 3:
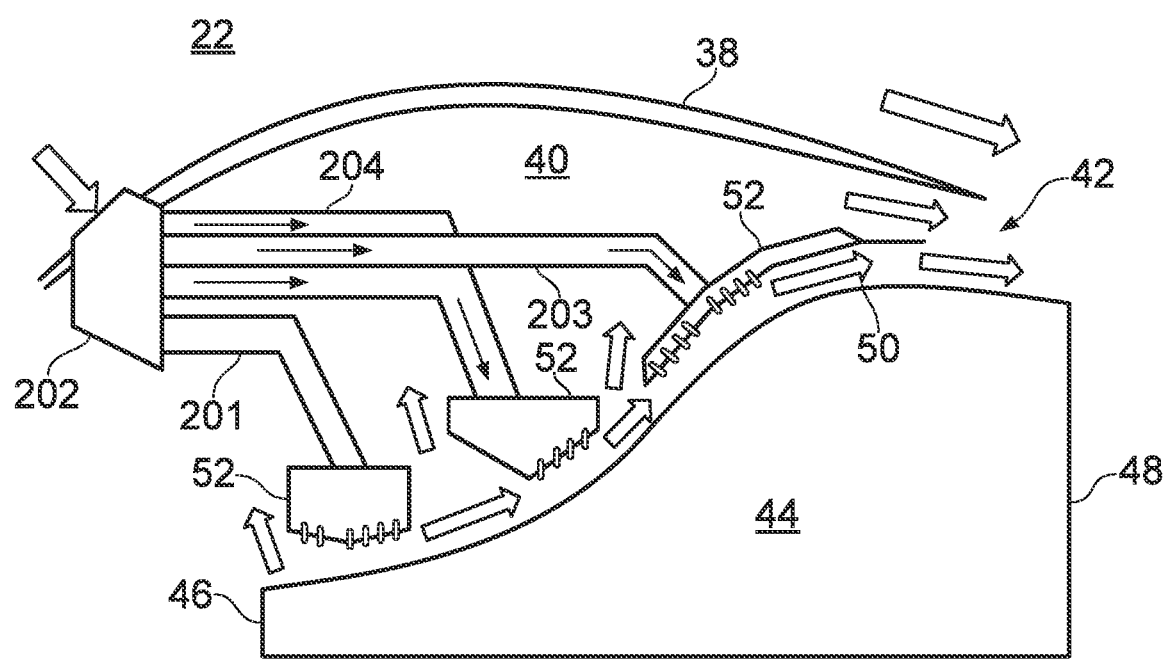
FIG. 3 schematically shows a part of a turbine cooling arrangement of the gas turbine engine of FIG. 2.

FIG. 3 shows an enlargement of part of a turbine assembly 44 of the gas turbine engine 10. The turbine assembly 44 has an inlet 46 and an outlet 48 at its axially upstream and downstream ends respectively. The turbine assembly 44 is radially enclosed by turbine casing 50. The turbine assembly 44 may comprise one, two or three turbine stages such as the high pressure turbine 17, intermediate pressure turbine 18 and low pressure turbine 19. The turbine casing 50 may be a single annular component that extends axially from the inlet 46 to the outlet 48 of the turbine assembly 44. Alternatively, the turbine casing 50 may be axially segmented so that there are two or more axial portions, for example one portion for each turbine stage 17, 18, and 19. Such a segmented turbine casing 50 comprises suitable sealing between the axial portions to prevent egress of working fluid from the core engine 34 gas path into the flow zone 40.

The gas turbine engine 10 is provided with a cooling arrangement (or system) for cooling the turbine casing 50. As will be described in detail below, the cooling arrangement is configured to direct a cooling gas flow onto the turbine casing 50. The cooling assembly comprises a plurality of annular manifolds 52 that are radially outside the turbine casing 50 and spaced therefrom by a small distance. In this arrangement there are three manifolds, one for each turbine stage. In particular, each manifold 52 is axially aligned with a respective turbine stage 17, 18, 19. The manifolds 52 are arranged to provide cooling air to impingement cool a portion of the turbine casing 50 through impingement cooling holes provided in their radially inwardly directed surfaces. There may be an annular gap between pairs of manifolds 52 through which cooling air is expelled into the flow zone 40 after it impinges on the turbine casing 50. Some cooling air is entrained to flow downstream along the turbine casing 50 after impinging on a portion of the turbine casing 50. In an alternative arrangement a sealing structure may be provided between adjacent manifolds 52.

The cooling assembly further comprises a series of ducts 201, 203, 204 that supply cooling gas to the manifolds 52. The ducts 201 receive cooling air from the bypass duct 22 via a scoop 202 in the annular structure 38 (the radially inner wall of the bypass duct) which receives the bypass air flow. The cooling assembly comprises three ducts 201, 203, 204 (one for each manifold 52). A first manifold 52 is supplied with cooling gas from a single cooling duct 201, whilst second and third manifolds 52 are provided with cooling gas from a cooling duct assembly comprising a first inner cooling duct 203 and a second outer cooling duct 204.

It will be appreciated that while the ducts have been described above as receiving cooling air from the bypass duct 22 via a scoop 202 in the annular structure 38, this is not essential. The cooling air may be provided in any suitable or desired way, such as via an elevate (i.e. a higher pressure) source that is not from the bypass duct 22.

Figure 4:
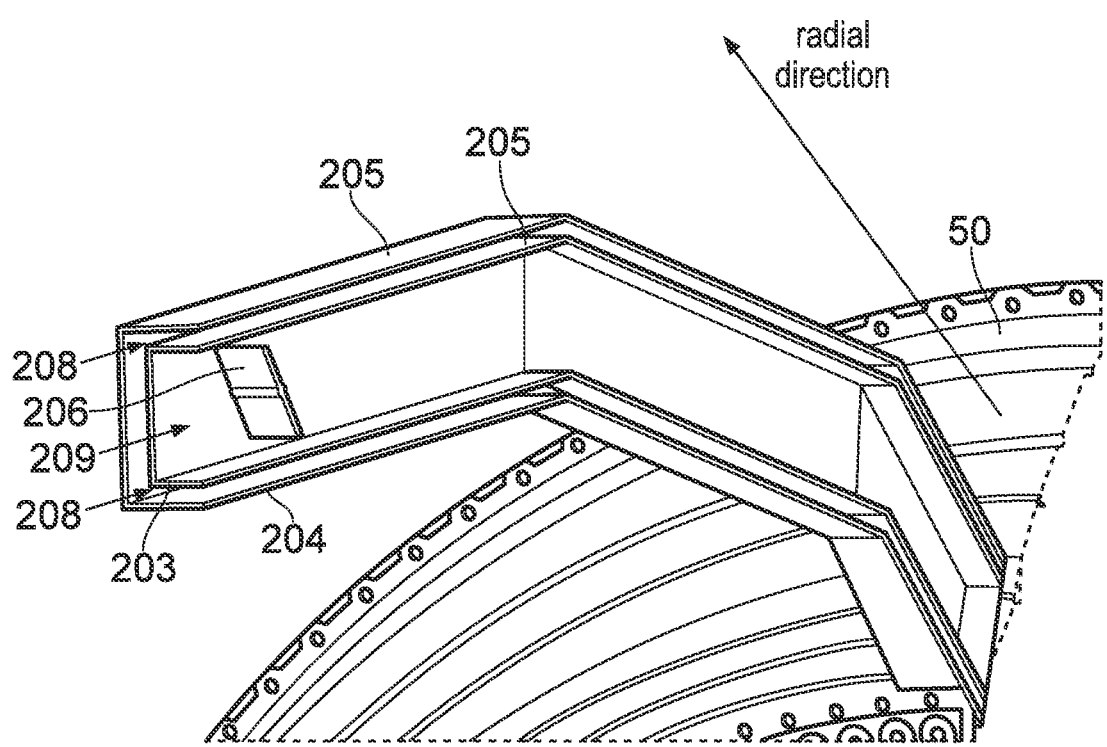
FIG. 4 schematically shows an enlarged sectional view of the ducts of the cooling arrangement of FIG. 3.

Referring now to FIG. 4, the first inner cooling duct 203 is located within the second outer cooling duct 204 to form a "duct-in-duct" arrangement. The inner duct 203 is positioned centrally within the outer duct 204 so that an annular flow passage is defined between the inner and outer ducts 203, 204. In use, first cooling air flows within the inner duct 203 whilst second cooling air flows in the annular passage between the inner and outer ducts 203, 204 and around the inner duct 203. The first and second cooling air flows remain separate. In this arrangement the inner duct 203 is located (or housed) within the outer duct 204 over the majority of its length. The inner and outer ducts 203, 204 are provided with cooling gas (air) from the scoop 202 and, as described above, supply the cooling air to separate manifolds 52. However, in some arrangements the inner and outer ducts 203, 204 may supply cooling gas to a common manifold 52. Locating one duct 203 within another duct 204 may minimise the space occupied by the first and second cooling ducts 203, 204.

Each of the inner and outer cooling ducts 203, 204 has a square cross-sectional shape in a plane perpendicular to the longitudinal direction. As such, each duct 203, 204 is defined by four substantially planar walls. The ducts 203, 204 have a substantially uniform cross-section along their lengths. The inner duct 203 is centrally located within the outer duct 204 such that the ducts share a common central axis. In other arrangements the ducts 203, 204 could have a rectangular cross section, or a circular cross section, or any other suitable cross section. Further the inner and outer ducts may have different cross sections.

The inner duct 203 is provided with a valve 206, which in this arrangement is a butterfly valve 206, for modulating (i.e. controlling) the flow 209 of cooling fluid in the first cooling duct 203. In this arrangement the annular flow passageway defined between the inner and outer ducts 203, 204 is not provided with any valve and as such the cooling gas can flow therethrough unmodulated Since cooling gas flows around the inner duct 203 and within the inner duct 203, the surface temperature of the inner duct 203 may be relatively low. Accordingly, it may be appropriate to attach electronic equipment and/or a cable (e.g. a cable harness) to a wall of the inner duct 204.

Figure 5:
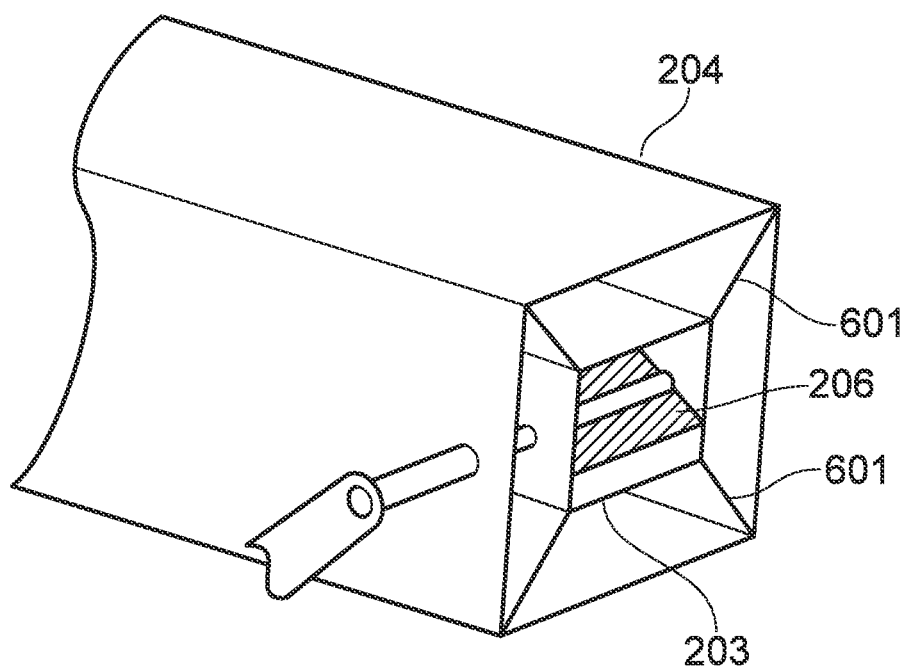
FIG. 5 schematically shows an enlarged view of the ducts of the cooling arrangement of FIG. 4.

As shown in FIG. 5, the first inner cooling duct 203 is mounted within the second outer cooling duct 204 by support ribs 601 that extend from the internal corners of the outer cooling duct 204 to the external corners of the inner cooling duct 203. It will be appreciated that alternative means for mounting and supporting the inner duct 203 within the outer duct 204 could be used.

Figure 6:
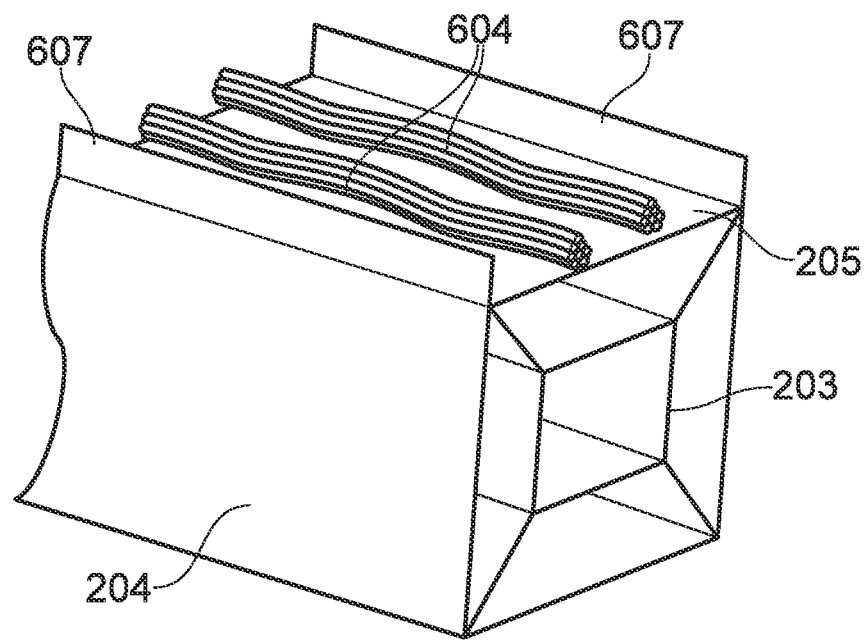
FIG. 6 schematically shows a further duct arrangement.
Figure 6:
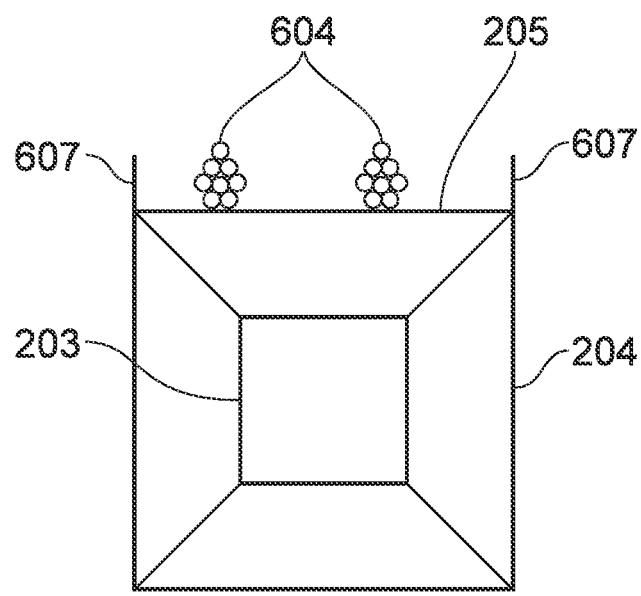

FIG. 6 shows an alternative duct-in-duct arrangement. In this arrangement the outer second cooling duct 204 is provided with a shielded tray for sensitive electronic equipment such as a cable harness 604 and/or electronic equipment. In this arrangement the tray is defined by a planar outer wall 205 of the second cooling duct 204 and first and second longitudinally extending lips 607 which project from the outer wall 205. The lips 607 may have the effect of at least reducing the radiative heating effect on the electronic equipment that is placed on the planar outer wall 205 (where the radiative heating originates from the turbine casing).

It should be appreciated that the disclosure is not limited to an inner duct within an outer duct. In other arrangements multiple inner ducts could be located within an outer duct. Further, a third duct could be located within the inner duct.

It will be understood that the technology described herein is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A cooling arrangement for a turbine casing of a gas turbine engine, comprising a first cooling duct that is located within a second cooling duct, wherein the first cooling duct is for a first cooling fluid flow, wherein the second cooling duct is for a second cooling fluid flow which in use flows around the first cooling duct, and wherein the second cooling duct is provided with a shielded tray on an outer surface thereof, the shielded tray being defined by a wall of the second cooling duct and one or more lips projecting from the second cooling duct.

2. The cooling arrangement as claimed in claim 1, wherein the first cooling duct and the second cooling duct feed into a single manifold having outlet holes for directing cooling fluid towards the turbine casing.

3. The cooling arrangement as claimed in claim 1, wherein the first cooling duct and the second cooling duct feed into separate manifolds, each manifold having outlet holes for directing cooling fluid towards the turbine casing.

4. The cooling arrangement as claimed in claim 1, wherein the first cooling duct is enclosed by the second cooling duct along the majority or substantially all of its length.

5. The cooling arrangement as claimed in claim 1, wherein the second cooling duct is configured to allow the second cooling fluid flow to flow therethrough substantially unmodulated.

6. The cooling arrangement as claimed in claim 1, wherein electronic equipment and/or one or more cables are mounted to the first cooling duct.

7. The cooling arrangement as claimed in claim 6, wherein the electronic equipment and/or the one or more cables are mounted to an inner side and/or an outer side of the first cooling duct.

8. The cooling arrangement as claimed in claim 1, wherein the first cooling duct comprises a valve for controlling the flow of the first cooling fluid flow.

9. The cooling arrangement as claimed in claim 1, wherein the first cooling duct and/or the second cooling duct has a substantially square or rectangular cross-section in a plane perpendicular to the longitudinal direction.

10. The cooling arrangement as claimed in claim 1, wherein the first cooling duct and/or the second cooling duct comprises one or more substantially planar walls.

11. The cooling arrangement as claimed in claim 1, wherein electronic equipment and/or one or more cables are within the shielded tray.

12. The cooling arrangement as claimed in claim 1, wherein the first cooling duct is mounted within the second cooling duct by at least one support element extending from one or more corners of the second cooling duct.

13. A gas turbine engine comprising a cooling arrangement as claimed in claim 1.

14. A cooling arrangement for a turbine casing of a gas turbine engine, comprising a first cooling duct that is located within a second cooling duct, wherein the first cooling duct is for a first cooling fluid flow, wherein the second cooling duct is for a second cooling fluid flow which in use flows around the first cooling duct, and wherein electronic equipment and/or one or more cables are mounted to the first cooling duct.

15. The cooling arrangement as claimed in claim 14, wherein the electronic equipment and/or the one or more cables are mounted to an inner side and/or an outer side of the first cooling duct.

16. A cooling arrangement for a turbine casing of a gas turbine engine, comprising a first cooling duct that is located within a second cooling duct, wherein the first cooling duct is for a first cooling fluid flow, wherein the second cooling duct is for a second cooling fluid flow, which in use, flows around the first cooling duct, wherein the first cooling duct comprises a valve for controlling the first cooling fluid flow, and wherein the valve is located in a portion of the first cooling duct that is enclosed by the second cooling duct.

* * * * *